United States Patent
Aoyagi et al.

(10) Patent No.: US 11,716,430 B2
(45) Date of Patent: Aug. 1, 2023

(54) IMAGE ABNORMALITY DETECTING DEVICE AND IMAGE FORMING APPARATUS INCORPORATING THE IMAGE ABNORMALITY DETECTING DEVICE

(71) Applicants: Kohta Aoyagi, Kanagawa (JP); Tohru Matsumoto, Kanagawa (JP); Kimiharu Yamazaki, Kanagawa (JP); Satoshi Nakayama, Kanagawa (JP); Ryosuke Ebinuma, Tokyo (JP); Ryoh Ishizuka, Kanagawa (JP); Tatsuya Ishii, Kanagawa (JP)

(72) Inventors: Kohta Aoyagi, Kanagawa (JP); Tohru Matsumoto, Kanagawa (JP); Kimiharu Yamazaki, Kanagawa (JP); Satoshi Nakayama, Kanagawa (JP); Ryosuke Ebinuma, Tokyo (JP); Ryoh Ishizuka, Kanagawa (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/587,300

(22) Filed: Jan. 28, 2022

(65) Prior Publication Data
US 2022/0263963 A1 Aug. 18, 2022

(30) Foreign Application Priority Data
Feb. 15, 2021 (JP) ................ 2021-021628

(51) Int. Cl.
*H04N 1/04* (2006.01)
*H04N 1/00* (2006.01)

(52) U.S. Cl.
CPC ..... *H04N 1/00726* (2013.01); *H04N 1/00708* (2013.01); *H04N 1/00734* (2013.01)

(58) Field of Classification Search
CPC .......... H04N 1/00726; H04N 1/00708; H04N 1/00734
See application file for complete search history.

(56) References Cited

U.S. PATENT DOCUMENTS

| 2012/0099168 A1* | 4/2012 | Ninomiya .......... H04N 1/00087 358/498 |
| 2018/0020108 A1* | 1/2018 | Nakayama ............. B65H 5/068 |

(Continued)

FOREIGN PATENT DOCUMENTS

| EP | 2642740 A2 | 9/2013 |
| JP | 2020-046523 | 3/2020 |

OTHER PUBLICATIONS

Extended European Search Report dated Jul. 8, 2022 issued in corresponding European Appln. No. 22154202.0.

*Primary Examiner* — Moustapha Diaby
(74) *Attorney, Agent, or Firm* — Harness, Dickey & Pierce, P.L.C.

(57) ABSTRACT

An image abnormality detecting device includes an image reader, an abnormality detector, a pattern holder, and circuitry. The image reader is configured to read an image on a recording medium. The abnormality detector is configured to detect abnormality of the image based on read information of the image on the recording medium, read by the image reader. The pattern holder has a check pattern and is disposed within a reading area of the image reader. The circuitry is configured to inspect a detecting operation of the abnormality detector based on read information of the check pattern read by the image reader.

20 Claims, 6 Drawing Sheets

(56) References Cited

U.S. PATENT DOCUMENTS

| | | |
|---|---|---|
| 2019/0202648 A1 | 7/2019 | Nakayama et al. |
| 2020/0089151 A1* | 3/2020 | Yoshino ............. G03G 15/5041 |
| 2021/0016584 A1 | 1/2021 | Aoyagi et al. |
| 2021/0168253 A1 | 6/2021 | Nakayama et al. |
| 2021/0297543 A1 | 9/2021 | Nakayama et al. |

* cited by examiner

IMAGE ABNORMALITY DETECTING DEVICE AND IMAGE FORMING APPARATUS INCORPORATING THE IMAGE ABNORMALITY DETECTING DEVICE

CROSS-REFERENCE TO RELATED APPLICATION

This patent application is based on and claims priority pursuant to 35 U.S.C. § 119(a) to Japanese Patent Application No. 2021-021628, filed on Feb. 15, 2021, in the Japan Patent Office, the entire disclosure of which is hereby incorporated by reference herein.

BACKGROUND

Technical Field

Embodiments of the present disclosure relate to an image abnormality detecting device and an image forming apparatus incorporating the image abnormality detecting device.

Background Art

Various types of typical image abnormality detecting devices are known to include an image reader that reads an image on a recording medium, an abnormality detector that detects abnormality of the image based on the read information read by the image reader, and an operation inspector that inspects a detecting operation of the abnormality detector.

For example, a known image forming apparatus includes the configuration of the above-described image abnormality detecting device. When executing a print job, this image forming apparatus causes an image forming device to form a check image for checking the detection level of image abnormality detected by an abnormality detector included in the image abnormality detecting device. The image forming apparatus then causes the abnormality detector to detect image abnormality with respect to a sheet on which the check image is formed and performs confirmation (inspection) of the detecting operation of the abnormality detector based on the detection result of the abnormality detector in this detection.

SUMMARY

Embodiments of the present disclosure described herein provide a novel image abnormality detecting device including an image reader, an abnormality detector, a pattern holder, and circuitry. The image reader is configured to read an image on a recording medium. The abnormality detector is configured to detect abnormality of the image based on read information of the image on the recording medium, read by the image reader. The pattern holder has a check pattern and is disposed within a reading area of the image reader. The circuitry is configured to inspect a detecting operation of the abnormality detector based on read information of the check pattern read by the image reader.

Further, embodiments of the present disclosure described herein provide an image forming apparatus an image forming device and the above-described image abnormality detecting device. The image forming device is configured to form an image on a recording medium. The image abnormality detecting device is configured to detect image abnormality in the image formed on the recording medium by the image forming device.

BRIEF DESCRIPTION OF THE SEVERAL VIEWS OF THE DRAWINGS

Exemplary embodiments of this disclosure will be described in detail based on the following figures, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an image abnormality detecting device and an image forming apparatus, according to an embodiment of the present disclosure, with reference to drawings. Note that identical parts or equivalents are given identical reference numerals and redundant descriptions are summarized or omitted accordingly.

Note that the image abnormality detecting device according to the present disclosure is not limited to an image abnormality detecting device provided in an image forming apparatus and may be configured separately from the image forming apparatus.

Figure 1:
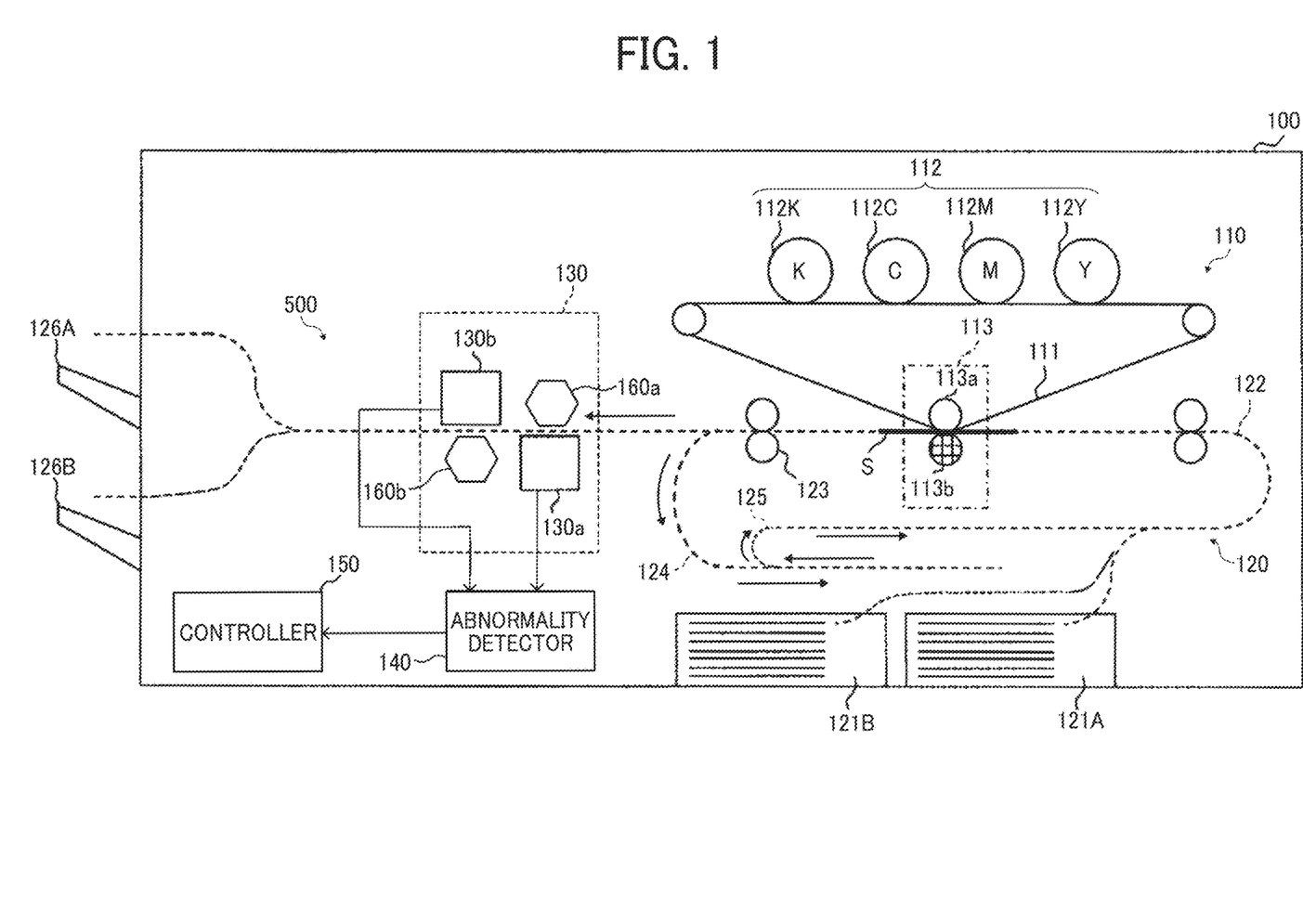
FIG. 1 is a schematic view of a configuration of an image forming apparatus according to an embodiment of the present disclosure.

FIG. 1 is a diagram illustrating a schematic view of a configuration of an image forming apparatus 100 according to the present embodiment.

The image forming apparatus 100 according to the present embodiment includes an image forming device 110, a sheet conveyor 120, an image reading device 130, an abnormality detector 140, a controller 150, and pattern holders 160a and 160b. The image reading device 130, the abnormality detector 140, the controller 150, and the pattern holders 160a and 160b are included in an image abnormality detecting device 500.

The image forming device 110 includes four photoconductor drums 112Y, 112M, 112C, and 112K corresponding to images of respective colors of yellow (Y), magenta (M), cyan (C), and black (K) each being an image forming material such as toner. Electrostatic latent images of respective colors are formed by electrophotography on the photoconductor drums 112Y, 112M, 112C, and 112K based on image information. Then, respective colors of toners are applied to the respective electrostatic latent images to develop the respective electrostatic latent images to visible toner images.

The four photoconductor drums 112Y, 112M, 112C, and 112K are disposed along an intermediate transfer belt 111 having an endless loop. The intermediate transfer belt 111 functions as an intermediate transfer body. The intermediate transfer belt 111 is wound around at least one drive roller and a plurality of driven rollers and moves between a primary transfer position and a secondary transfer position. The primary transfer position is a position where images (toner images of respective single colors) developed on the photoconductor drums 112Y, 112M, 112C, and 112K are primarily transferred and overlaid on one after another to form a color toner image. The color toner image that was primarily transferred onto the surface of the intermediate transfer belt 111 is conveyed to the secondary transfer position at which the color toner image is secondarily transferred onto a sheet S along with rotation of the intermediate transfer belt 111.

A transfer device 113 is disposed at the secondary transfer position. The transfer device 113 includes a transfer roller 113a and a counter roller 113b that is disposed facing the transfer roller 113a. The sheet S is conveyed to the transfer device 113 in synchrony with the timing at which the toner image formed on the surface of the intermediate transfer belt 111 reaches the secondary transfer position. The transfer device 113 transfers the toner image formed on the surface of the intermediate transfer belt 111 onto the sheet S that is conveyed in a conveyance direction of the sheet S (sub-scanning direction).

The sheet conveyor 120 includes sheet feed trays 121A and 121B, a conveyance passage 122, a fixing roller pair 123, a conveyance passage switcher 124, and a reversal passage 125. The sheet feed trays 121A and 121B each loads the sheet S. The conveyance passage 122 is provided with a plurality of roller pairs to convey the sheet S. The fixing roller pair 123 is disposed downstream from the transfer device 113 in the conveyance direction of the sheet S. When the image forming operation is performed, under control of the controller 150, the sheet S that is loaded in one of the sheet feed trays 121A and 121B is separated by a pickup roller, conveyed along the conveyance passage 122, and reaches the transfer device 113. In this transfer process of the transfer device 113, an image is formed on one side (first face) of the sheet S.

The sheet S having the image on the first face is further conveyed, so that the toner image is fixed to the sheet S by the fixing roller pair 123. Then, the sheet S is conveyed to the conveyance passage switcher 124 disposed downstream from fixing roller pair 123 in the conveyance direction of the sheet S. Then, the travel direction of the sheet S is reversed in the conveyance passage switcher 124. The sheet S is then conveyed to the reversal passage 125. The sheet S is then conveyed to the secondary transfer position again, with the back face (second face) of the sheet S facing the intermediate transfer belt 111 at the secondary transfer position. In this transfer process of the transfer device 113, an image is formed on the second face of the sheet S. The sheet S having the image on the second face is further conveyed, so that the toner image on the second face of the sheet S is fixed to the sheet S by the fixing roller pair 123. Then, the sheet S is conveyed to the image reading device 130 disposed downstream from the fixing roller pair 123 in the conveyance direction of the sheet S. The sheet S that has passed through the image reading device 130 is ejected to one of sheet ejection trays 126A and 126B.

The image reading device 130 includes readers 130a and 130b. The reader 130a reads the first face of the sheet S. The reader 130b reads the second face of the sheet S. The readers 130a and 130b have the similar configuration to each other in the present embodiment. However, the reader 130a and the reader 130b may have different configurations from each other. The reader 130a reads an image formed on the sheet S at the position facing the pattern holder 160a, in other words, the sheet S between the reader 130a and the pattern holder 160a and outputs the read information to the abnormality detector 140. Similarly, the reader 130b reads an image formed on the sheet S at the position facing the pattern holder 160b, in other words, the sheet S between the reader 130b and the pattern holder 160b and outputs the read information to the abnormality detector 140.

Figure 2:
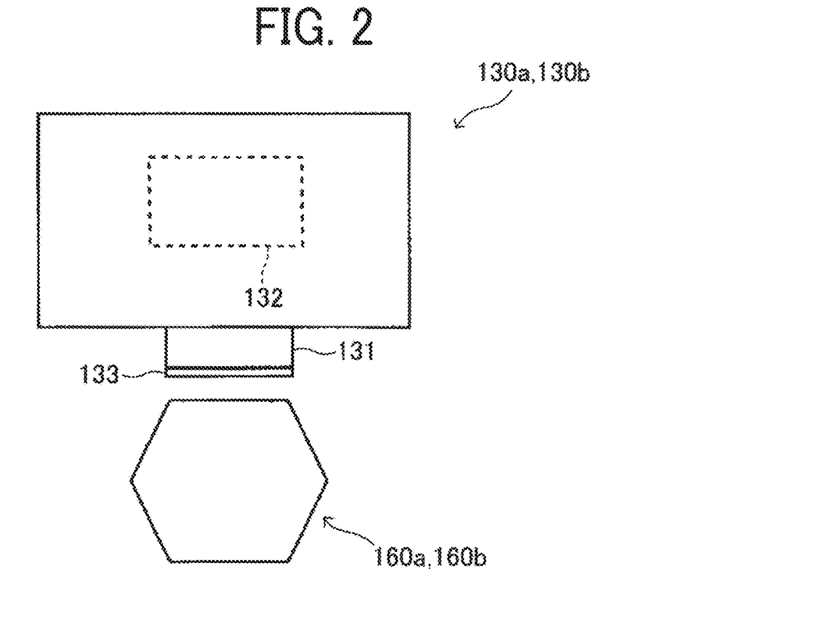
FIG. 2 is a schematic diagram illustrating an example of a configuration of an image reading device included in the image forming apparatus of FIG. 1.

FIG. 2 is a schematic diagram illustrating an example of a configuration of each of the readers 130a and 130b in the image forming apparatus 100, according to the present embodiment.

Each of the readers 130a and 130b includes an irradiation unit 131, a line image sensor 132, and a cover glass 133. The irradiation unit 131 irradiates the sheet S with light when the sheet S passes through the reading position. The line image sensor 132 includes a plurality of light receiving elements that perform photoelectric conversion for each pixel. The light receiving elements are disposed in a one-dimensional shape in a width direction of the sheet S (i.e., direction orthogonal to the conveyance direction of the sheet S, that is, main scanning direction). The light emitted from the irradiation unit 131 passes through the cover glass 133 and is reflected by the sheet S and the pattern holders 160a and 160b. The reflection light passes through the cover glass 133 and is incident on the line image sensor 132.

Under control of the controller 150, the readers 130a and 130b repeatedly perform a reading operation for one line extending in the width direction of the sheet in synchrony with the conveyance of the sheet S that passes the reading position. By so doing, the readers 130a and 130b each reads the image printed on the sheet S as a two-dimensional image. Further, under control of the controller 150, the readers 130a and 130b repeatedly perform a reading operation for one line extending in the width direction of the sheet at a predetermined timing. By so doing, the readers 130a and 130b read check patterns provided on the pattern holders 160a and 160b, respectively, as a two-dimensional image.

Note that the irradiation unit 131 and the line image sensor 132 of the reader 130a are disposed below the conveyance passage of a sheet. By contrast, the irradiation unit 131 and the line image sensor 132 of the reader 130b are disposed above the conveyance passage of a sheet. On the other hand, the pattern holder 160a disposed facing the reading area of the reader 130a within the reading area of the reader 130a is disposed above the conveyance passage of a sheet and the pattern holder 160b disposed facing the reading area of the reader 130b within the reading area of the reader 130b is disposed below the conveyance passage of a sheet.

The readers 130a and 130b according to the present embodiment each includes a line image sensor but may employ an area sensor in which the light receiving elements are disposed in a two-dimensional manner or an imaging device such as a camera.

Figure 3:
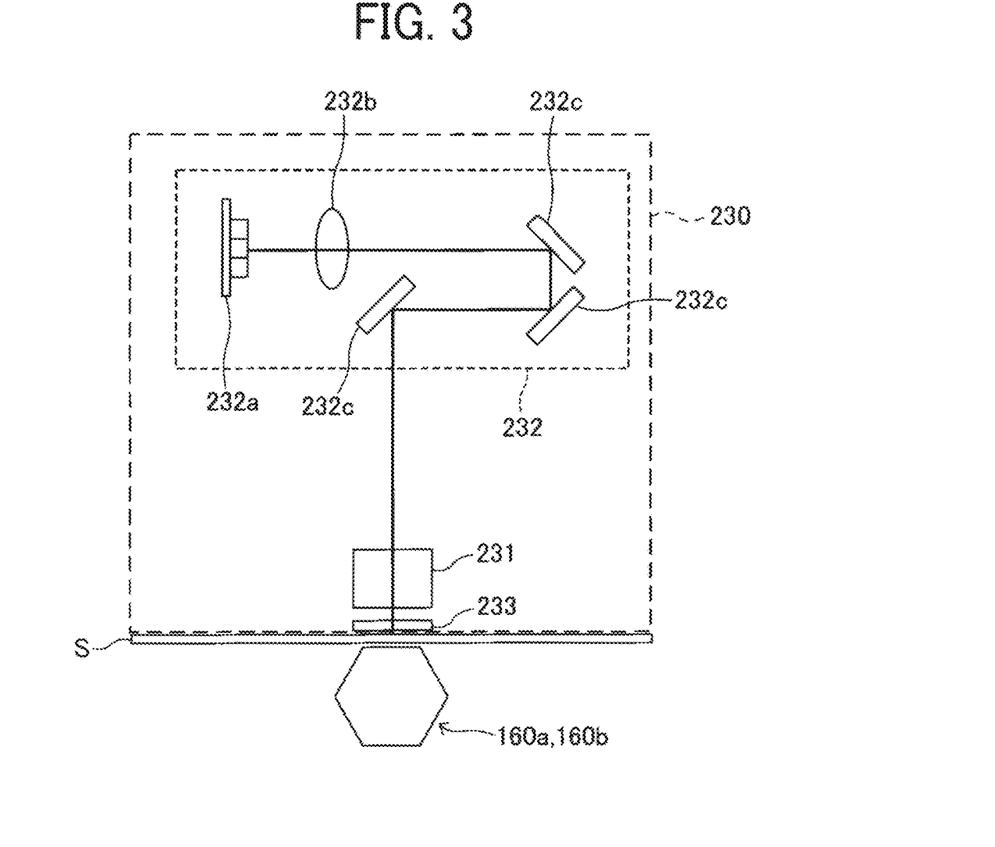
FIG. 3 is a schematic diagram illustrating another example of a configuration of the image reading device included in the image forming apparatus of FIG. 1.

Further, FIG. 3 is a schematic diagram illustrating another example of a configuration of the image reading device 130 included in the image forming apparatus 100 of FIG. 1.

The readers 130a and 130b according to the present embodiment may be a scanner 230 as illustrated in FIG. 3. The scanner 230 includes an irradiation unit 231, a reading device 232, and an exposure glass 233. The irradiation unit 231 irradiates the sheet S with light when the sheet S passes the reading position. The reading device 232 includes an image sensor 232a, a lens 232b, and mirrors 232c. Light emitted from the irradiation unit 231 passes through the exposure glass 233 to be reflected on the sheet S or the pattern holders 160a and 160b. The reflection light then passes through the exposure glass 233 to be incident on the reading device 232 and is received by the image sensor 232a.

The abnormality detector 140 detects image abnormality based on the read information obtained by the image reading device 130 by reading the image on the sheet S. Image abnormality indicates a defect occurred in an image or an image portion that is not an image (intended image) based on the image information. Specifically, the defect appears on an image and includes spot stain (e.g., black spot), void (e.g., white spot), and streak (e.g., black streak and white streak). "Spot stain (black spot)" is a defect generated due to toner adhered to an unintended portion. "Void (white spot)" is a defect that toner does not adhere to a portion to which toner is to adhere (toner is void). "Streak" is an unintended linear image and includes a black streak (i.e., streak having a density higher than the density of a part around the streak) and a white streak (i.e., streak having a density lower than the density of a part around the streak). Further, such a defect also includes a vertical streak along the conveyance direction of a sheet, a horizontal streak along the width direction of the sheet, and an oblique streak in the oblique direction to the conveyance direction of the sheet.

The abnormality detector 140 according to the present embodiment detects various image abnormalities described above, for example, by detecting an image portion having a density abnormality in which the density of the image is different from an intended density (target density based on image information or an image forming condition), in other words, by detecting an image portion having a density difference exceeding an allowable range with respect to the target density. Specifically, the abnormality detector 140 compares a read image based on the read information with a reference image having no image abnormality, in other words, with an image based on the image data when the image on the sheet S is formed, so as to detect an image abnormality. When an image abnormality is detected, the abnormality detector 140 outputs detection result information including the position, type, and abnormality level (degree of abnormality) of the image abnormality, to the controller 150.

The abnormality level of the image abnormality detected by the abnormality detector 140 is classified into levels based on, for example, a difference in dimension (dimension level), for example, size of a spot stain or thickness of a streak, and a difference in density (density level) that is a density difference from the target density.

Figure 4:
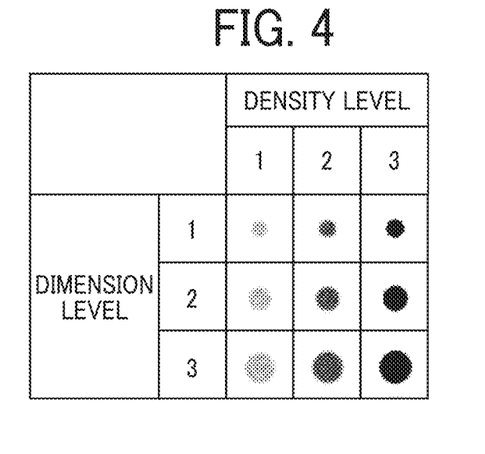
FIG. 4 is a schematic diagram illustrating an abnormality level of image abnormality that is detected by an abnormality detector included in the image forming apparatus of FIG. 1.

Specifically, FIG. 4 is a schematic diagram illustrating an abnormality level of image abnormality that is detected by the abnormality detector 140 included in the image forming apparatus 100 of FIG. 1.

As illustrated in FIG. 4, sizes (dimensions) of multiple levels of the image abnormalities of spot stains are classified into three levels and defined as Dimension Levels 1 to 3 and densities of multiple levels of the image abnormalities of spot stains are classified into three levels and defined as Density Levels 1 to 3. For example, in a case in which an image abnormality in Dimension Level 2 was detected and an image abnormality in Dimension Level 1 was not detected, the abnormality level of the dimension is 2. The same manner is applied to the "density level."

The controller 150 controls the overall operation of the image forming apparatus 100 and a series of processes and operations for forming an image on a sheet S as a sheet-shaped recording medium. In addition, the controller 150 executes processes when the abnormality detector 140 has detected image abnormality. For example, the controller 150 determines whether to allow detected image abnormality or not, based on an optional set value that is set in advance. The optional set value is a boundary value used for determining whether to allow the image abnormality or not. When the abnormality level of the image abnormality exceeds the optional set value, the controller 150 executes processing of the image abnormality (for example, handling the recording medium having the image abnormality is dealt as a waste sheet). On the other hand, when the abnormality level of the image abnormality is within the optional set value, the controller 150 does not execute the processing of the image abnormality.

In addition, the controller 150 functions as an operation inspector and executes an operation inspection process for inspecting the detecting operation of the abnormality detector 140. In the operation inspection process according to the present embodiment, the image reading device 130 reads the check patterns provided on the pattern holders 160a and 160b, and the detecting operation of the abnormality detector 140 is inspected based on the read information of the read check patterns.

Figure 5:
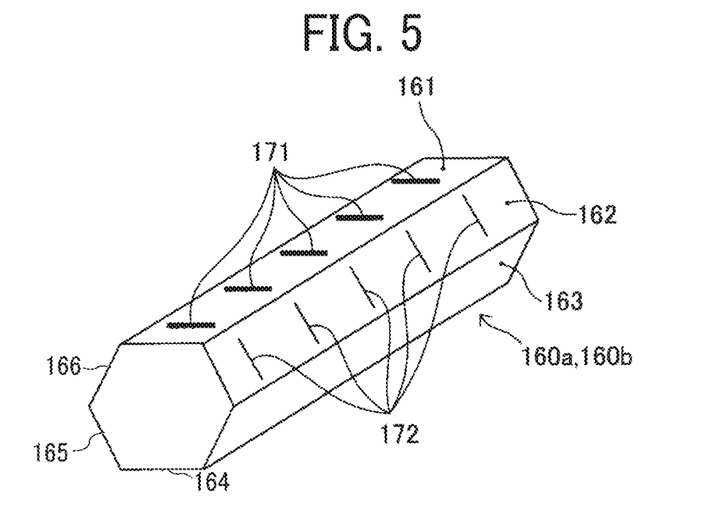
FIG. 5 is a schematic diagram illustrating an example of a check pattern provided on a pattern holder included in the image forming apparatus of FIG. 1.

FIG. 5 is a schematic diagram illustrating an example of check patterns provided on each of the pattern holders 160a and 160b according to the present embodiment.

The pattern holders 160a and 160b according to the present embodiment are pillar-shaped members each having a polygonal cross-sectional shape (regular hexagon in the present embodiment). Each of the pattern holders 160a and 160b has six (6) outer circumferential faces, on each of which a check pattern is formed (pattern-formed faces). As each of the pattern holders 160a and 160b axially rotates, one outer circumferential face out of the six outer circumferential faces (in other words, an outer circumferential face at a position facing the reading area within the reading area) is switchably selected to face the image reading device 130.

The pattern holders 160a and 160b illustrated in FIG. 5 each includes a plurality of check patterns corresponding to a defect image of a black streak. To be more specific, a plurality of linear images having different thicknesses (dimensions) are respectively provided on two outer circumferential faces 161 and 162 of each of the pattern holders 160a and 160b. These linear images respectively include check patterns 171 and 172. The image reading device 130 reads the check patterns 171 and 172, so that the abnormality detector 140 detects an image abnormality based on the read information. When the detection result information of the abnormality detector 140 is appropriate, the detecting operation of the abnormality detector 140 is normal. In other words, when the position of the image abnormality is accurately detected; the type of the image abnormality is detected as a black streak; and the abnormality level is detected as a level corresponding to each of the check patterns 171 and 172, the detecting operation of the abnormality detector 140 is normal.

Note that the outer circumferential faces 163 to 166 other than the outer circumferential faces 161 and 162 of each of the pattern holders 160a and 160b may be further provided with respective check patterns or may be provided with another function such as a white surface as a reference surface for shading correction.

The pattern holders 160a and 160b illustrated in FIG. 5 each includes six (6) outer circumferential faces, on each of which a check pattern is formed (pattern-formed faces). Due to such a configuration, as each of the pattern holders 160a and 160b axially rotates, an outer circumferential face at a position facing the reading area within the reading area is switchably selected to face the image reading device 130. Therefore, six (6) different check patterns may be formed on corresponding outer circumferential faces. As specific examples of check patterns formed on each of the pattern holders 160a and 160b, a black spot check pattern is formed on a white background image on a first outer circumferential face 161; a black streak check pattern is formed on a white background image on a second outer circumferential face 162; a black streak check pattern is formed on a low-density colored background image on a third outer circumferential face 163; a black streak check pattern is formed on a low-density colored background image on a fourth outer circumferential face 164; a white spot check pattern is formed on a high-density colored background image on the a fifth outer circumferential face 165; and a white streak check pattern is formed on a high-density colored background image on a sixth outer circumferential face 166.

For example, the check patterns of the pattern holders 160a and 160b may be directly printed on the outer circumferential faces 161 and 162 of each of the pattern holders 160a and 160b or a sheet on which the check patterns are printed may be attached to the outer circumferential faces 161 and 162 of each of the pattern holders 160a and 160b. In any case, the check patterns of each of the pattern holders 160a and 160b are repeatedly used in the inspection of the detecting operation of the abnormality detector 140 repeatedly performed at a predetermined timing. As a result, check patterns of the same quality are used in the inspection repeatedly performed, so that there is no variation in inspection results and high inspection accuracy is continuously obtained.

In typical image forming apparatuses, a check image formed on the sheet by the image forming device is used as a check pattern to inspect the detecting operation of the abnormality detector. The quality of the check image formed on the sheet by the image forming device may depend on the machine condition at the time of image formation, and sufficient inspection accuracy may not be obtained. Further, the quality of the check image may depend on the type (e.g., color, surface property) of a sheet on which the check image is formed, and sufficient inspection accuracy may not be obtained.

On the other hand, the image abnormality detecting device 500 according to the present embodiment may use the check patterns 171 and 172 provided on each of the pattern holders 160a and 160b as check patterns to inspect the detecting operation of the abnormality detector 140, as described above. Since the check patterns 171 and 172 are provided in the pattern holders 160a and 160b in advance, the quality of the check patterns is constant. That is, since the check pattern is not an image formed on a sheet by the image forming device, the quality of the check patterns is not affected by, for example, the machine condition and the type of sheet. Therefore, the inspection accuracy of the image abnormality detecting device 500 is greater than the inspection accuracy of typical image abnormality detecting devices.

In addition, such typical image abnormality detecting devices may include a defect image in a check image formed on the sheet S by the image forming device. In this case, the detecting operation of the abnormality detector is not inspected normally. On the other hand, in the image abnormality detecting device 500 according to the present embodiment, the check patterns 171 and 172 provided on each of the pattern holders 160a and 160b have the constant image quality, a defect image is not included unlike the typical image abnormality detecting devices, and a situation in which the detecting operation of the abnormality detector 140 is not normally inspected does not occur.

Further, as in the typical devices or apparatuses, when the detecting operation of the abnormality detector is inspected, a check image is formed on a sheet by the image forming device, and thus toner consumption, sheet consumption, or both are forced on a user. On the other hand, in the present embodiment, since each of the pattern holders 160*a* and 160*b* is provided with the check patterns 171 and 172, the user is not forced to consume toner or sheets.

Further, as in the typical devices or apparatuses, since a check image is to be formed on the sheet by the image forming device for each detecting operation of the abnormality detector, a deterioration in productivity may be concerned. On the other hand, in the present embodiment, since each of the pattern holders 160*a* and 160*b* includes the check patterns 171 and 172, a check image is not to be formed on the sheet S by the image forming device 110 for each detecting operation of the abnormality detector 140, and the deterioration in productivity is prevented.

Note that the check pattern is not particularly limited as long as the check pattern is useful for checking whether image abnormality is appropriately detected by the abnormality detector 140 or not. For example, each of the check patterns 171 and 172 illustrated in FIG. 5 is suitably used as a pattern based on which the abnormality detector 140 detects an image abnormality.

A specific check pattern may include a plurality of patterns different in at least one of shape, image density, or dimension. In this case, the detecting operation on various types of image abnormalities is inspected with the check patterns or the detection accuracy (detection sensitivity) of the same type of image abnormalities is inspected with the check patterns.

Figure 6:
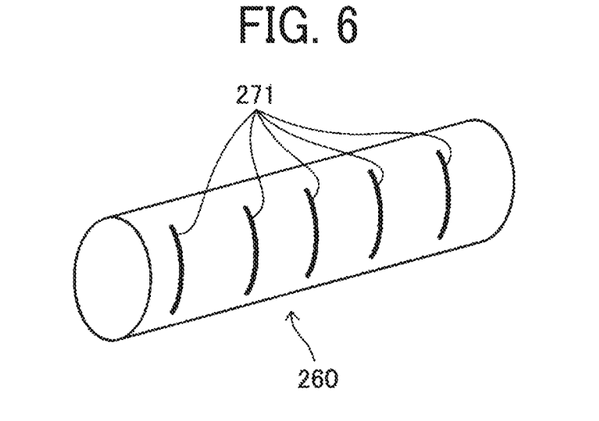
FIG. 6 is a schematic diagram illustrating another example of the check pattern provided on the pattern holder.

FIG. 6 is a schematic diagram illustrating another example of the check pattern provided on the pattern holder 260.

The pattern holder 260 illustrated in FIG. 6 is a cylindrical member (roller) having a circular cross section. The pattern holder 260 of the example illustrated in FIG. 6 reads the check patterns by the line image sensor 132 of the image reading device 130 while the pattern holder 260 rotates about the shaft. By so doing, each of the check patterns formed on the outer circumferential faces of the pattern holder 260 is read as a two dimensional image.

At this time, since the pattern holder 260 of the example illustrated in FIG. 6 is a cylindrical member, even if the pattern holder 260 is axially rotated, the distance between the outer circumferential face of the pattern holder 260 and the image reading device 130 is constant. Therefore, the image reading device 130 appropriately reads any check pattern at any circumferential position on the outer circumferential face of the pattern holder 260. Due to such a configuration, the area on the outer circumferential face of the pattern holder 260 on which the check pattern may be formed is not limited to the size of the reading area of the image reading device 130. For example, the check pattern may be disposed at any positions over the whole area in the circumferential direction on the outer circumferential face of the pattern holder 260.

By making the good use of this configuration, in the example of FIG. 6, a black streak check pattern 271 having the length longer than the length of the reading area of the image reading device 130 is formed on the outer circumferential face of the pattern holder 260 along the circumferential direction of the pattern holder 260 (conveyance direction of a sheet). By reading the black streak check pattern 271 with the line image sensor 132 of the image reading device 130 while the pattern holder 260 is axially rotating, a two-dimensional image (read information) including the black streak check pattern 271 is read.

Figure 7:
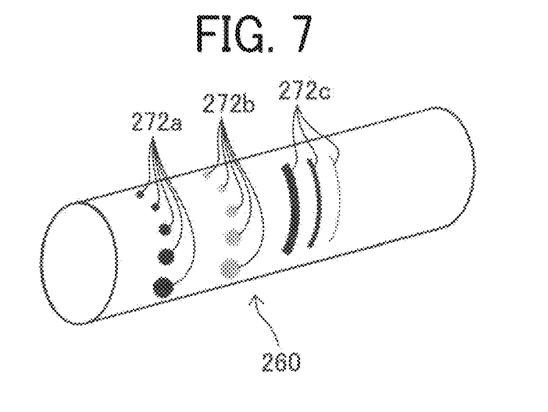
FIG. 7 is a schematic diagram illustrating yet another example of the check pattern provided on the pattern holder.

FIG. 7 is a schematic diagram illustrating yet another example of the check patterns of the pattern holder 260.

Since the pattern holder 260 illustrated in FIG. 7 is also a cylindrical member (roller) having a circular cross section, the area on the outer circumferential face of the pattern holder 260 in which the check pattern is formed is not limited to the size of the reading area of the image reading device 130.

By making the good use of this configuration, in the example of FIG. 7, multiple check patterns are formed on the outer circumferential face of the pattern holder 260 along the circumferential direction of the pattern holder 260 (conveyance direction of a sheet). To be specific, as illustrated in FIG. 7, multiple black spot check patterns 272*a* and 272*b* having different dimensions (diameters) from each other are formed on the outer circumferential face of the pattern holder 260 along the circumferential direction of the pattern holder 260. The line image sensor 132 of the image reading device 130 reads the multiple black spot check patterns 272*a* and 272*b* formed in this manner while the pattern holder 260 is axially rotating. By so doing, a two-dimensional image (read information) including the multiple black spot check patterns 272*a* and 272*b* is read.

In the example of FIG. 7, multiple check patterns are also formed in the axial direction on the outer circumferential face of the pattern holder 260 (width direction of a sheet). To be specific, multiple black spot check patterns 272*a* and 272*b* having different densities from each other and multiple black streak check patterns 272*c* having different sizes (thicknesses) and densities from each other are formed in the axial direction on the outer circumferential face of the pattern holder 260. The line image sensor 132 of the image reading device 130 reads the multiple check patterns 272*a*, 272*b*, and 272*c* formed in this manner, a two-dimensional image (read information) including the multiple check patterns 272*a*, 272*b*, and 272*c* is read.

Figure 8:
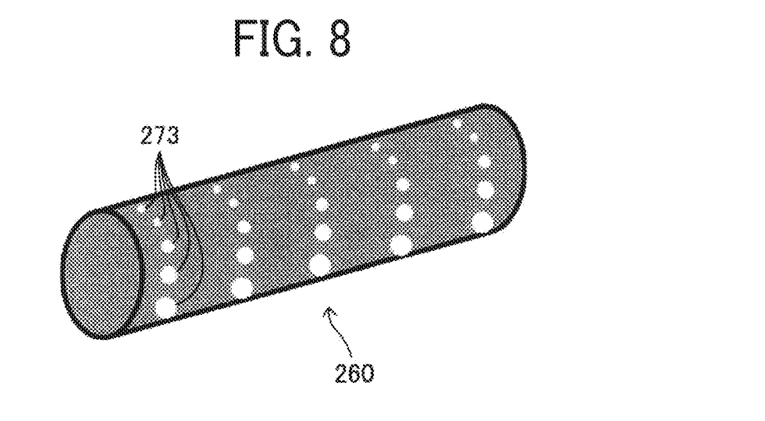
FIG. 8 is a schematic diagram illustrating yet another example of the check pattern provided on the pattern holder.

FIG. 8 is a schematic diagram illustrating yet another example of the check pattern provided on the pattern holder 260.

Since the pattern holder 260 illustrated in FIG. 8 is also a cylindrical member (roller) having a circular cross section, the area on the outer circumferential face of the pattern holder 260 in which the check pattern is formed is not limited to the size of the reading area of the image reading device 130.

As in the above-described examples, multiple check patterns are formed in the circumferential direction on the outer circumferential face of the pattern holder 260 (conveyance direction of a sheet) in the example of FIG. 8. Specifically, the outer circumferential face of the pattern holder 260 is colored (e.g., painted, color patch attached), and multiple white spot check patterns 273 having different dimensions (diameters) are formed on the colored outer circumferential face of the pattern holder 260. The line image sensor 132 of the image reading device 130 reads the multiple white spot check patterns 273 formed in this manner while the pattern holder 260 is axially rotating. By so doing, a two-dimensional image (read information) including the multiple white spot check patterns 273 is read.

Figure 9:
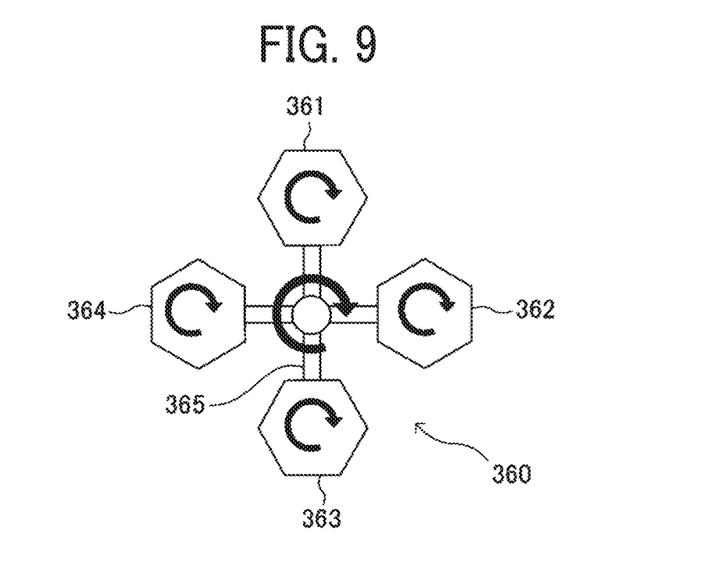
FIG. 9 is a diagram illustrating an example of the pattern holder having a plurality of pattern faces each forming a plurality of check patterns when switchably selecting a pattern face facing a reading area of the image reader from the plurality of pattern faces.

FIG. 9 is a diagram illustrating an example of a pattern holder 360 having a plurality of pattern faces, on each of which multiple of check patterns are formed, and a pattern face facing a reading area of the image reading device 130 to be switchably selected.

The pattern holder 360 illustrated in FIG. 9 includes a rotation support 365 rotatable about a central axis, and multiple rotary pattern holders 361 to 364 (four rotary pattern holders in the example illustrated in FIG. 9). The multiple rotary pattern holders 361 to 364 are respectively attached to multiple outer ends (four in the present example) of the rotation support 365 to be rotatable about the shaft of the rotation support 365. Similar to the pattern holders 160a and 160b illustrated in FIG. 5 described above, each of the rotary pattern holders 361 to 364 is a cylindrical member having a polygonal cross-sectional shape (regular hexagon in the present embodiment). As the rotary pattern holders 361 to 364 axially rotate, an outer circumferential face out of six (6) outer circumferential faces is switchably selected to face the image reading device 130.

According to such a configuration, by rotating the pattern holder 360 around the axial shaft, the multiple rotary pattern holders 361 to 364 being attached to the respective end portion are selectively positioned at a position facing the image reading device 130. With this configuration, the number of outer circumferential faces (pattern faces) facing the image reading device 130 is increased when compared with the case in which the pattern holder (single pattern holder illustrated in FIG. 5) is a single pattern holder. As a result, the greater number of check patterns may be used.

Further, instead of the rotary pattern holders 361 to 364 (pattern holders 160a and 160b illustrated in FIG. 5), a pattern holder 260 as illustrated in FIGS. 6 to 8 may be attached to the outer end portion of the pattern holder 360 illustrated in FIG. 9. As a result, multiple pattern holders 260 as illustrated in FIGS. 6 to 8 are used while being switched.

Figure 10:
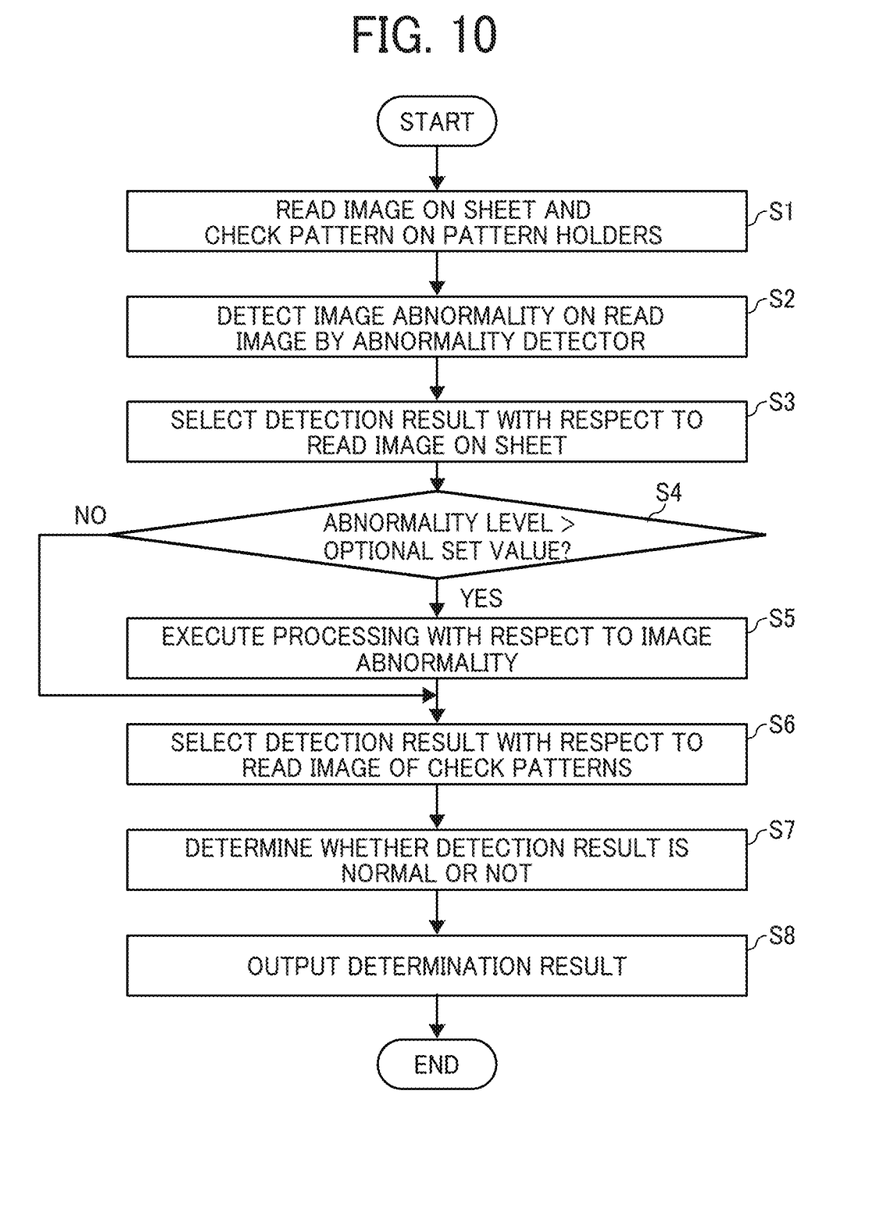
FIG. 10 is a flowchart of an operation inspection process according to an embodiment of the present disclosure.

FIG. 10 is a flowchart of the operation inspection process according to the present embodiment.

Figure 11:
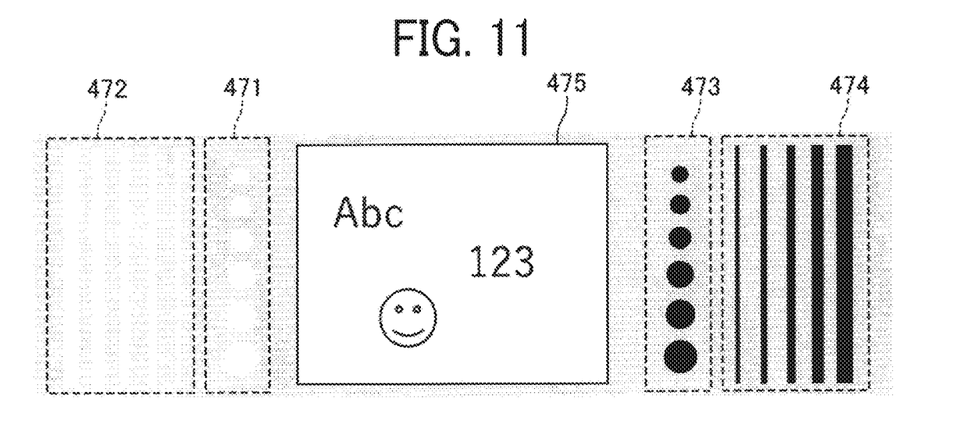
FIG. 11 is a diagram illustrating an example of a read image including the check pattern read by the image reader in the operation inspection process to inspect the detecting operation of the abnormality detector.

FIG. 11 is a diagram illustrating an example of an image (read information) including the check pattern read by the image reading device 130 in the operation inspection process for inspecting the detecting operation of the abnormality detector 140.

Note that the pattern holder used in the example of FIG. 11 is a cylindrical member (roller) as illustrated in FIGS. 6 to 8. On the outer circumferential face of the pattern holder, a check pattern is not provided at the center portion in the axial direction of the pattern holder facing the sheet S. On the other hand, a check pattern is provided near an axial end portion of the pattern holder facing both outer sides in the width direction of the sheet S.

In the vicinity of one axial end of the pattern holder (at the left side in FIG. 11), the check patterns of the example illustrated in FIG. 11 includes the multiple white spot check patterns 471 and the multiple white streak check patterns 472 on the low-density colored background image. The multiple white spot check patterns 471 have different dimensions (diameters) from each other and are disposed along the circumferential direction. The multiple white streak check patterns 472 have relatively long dimensions (thickness) different from each other and are disposed along the circumferential direction. Near the opposite axial end portion of the pattern holder (right side in FIG. 11), the check patterns of the example illustrated in FIG. 11 includes multiple black spot check patterns 473 and multiple black streak check patterns 474 on the low-density colored background image. The black spot check patterns 473 have different dimensions (diameters) from each other and are disposed along the circumferential direction. The multiple black streak check patterns 474 have relatively long dimensions (thickness) different from each other and are disposed along the circumferential direction.

In the operation inspection process according to the present embodiment as described in the flowchart of FIG. 10, each time the sheet S having an image formed by the image forming device 110 passes the reading area in the image forming operation, the image reading device 130 reads an image 475 on the sheet S and the check patterns 471 to 474 on the outer circumferential faces of the pattern holders disposed on both outer side of the sheet S in the width direction (51). As a result, the read image (read information) as illustrated in FIG. 11 is obtained.

The abnormality detector 140 compares the read image with the reference image having no image abnormality (image based on the image information obtained when the image on the sheet S is formed), so as to detect image abnormality on the read image (S2). As a result, the abnormality detector 140 outputs, to the controller 150, detection result information about the image on the sheet S (e.g., position, type, or abnormality level of the image abnormality) and detection result information about the image not on the sheet S (e.g., check patterns on both outer sides of the sheet S in the width direction).

The controller 150 uses the detection result information of the image on the sheet S to determine allowance of the image abnormality, in other words, the controller 150 selects the detection result with respect to the read image on the sheet S (S3), then determines whether the abnormality level of the image abnormality is greater than the optional set value (S4). When the abnormality level of the image abnormality is greater than the optional set value (YES in S4), the controller 150 executes processing with respect to the image abnormality (S5). On the other hand, when the abnormality level of the image abnormality is not greater than the optional set value, that is, when the abnormality level of the image abnormality is equal to or smaller than the optional set value (NO in S4), the controller 150 does not execute processing with respect to the image abnormality and skip to step S6.

On the other hand, the controller 150 uses the detection result information of the image outside the sheet S (i.e., check patterns on both outer sides of the sheet S in the width direction), in other words, the controller 150 selects the detection result with respect to the read image of the check patterns, to execute the operation inspection process to inspect the detecting operation of the abnormality detector 140 (S6). To be more specific, the controller 150 determines whether the detection result, that is, the detection result information about the check pattern output by the abnormality detector 140 is normal or not (S7) and transmits (outputs) information indicating the determination result, to an external device or displays the information on a display unit of the image forming apparatus (S8).

In the present embodiment, since the check pattern provided in advance on the pattern holder is used, for example, the position of the check pattern in the read image, the type of the corresponding image abnormality, and the abnormality level are grasped in advance. The controller 150 compares, for example, the detection result information about the check pattern output by the abnormality detector 140, with the check pattern that is grasped in advance, to determine whether the detection result information matches the check pattern. By so doing, the controller 150 determines whether the detection result information is normal or not.

In the present embodiment, the controller 150 causes the detecting operation of the abnormality detector 140 to be inspected based on a read image (read information) that is obtained (read) by the image reading device 130 by reading the check pattern of the pattern holder, together with an image on the sheet S during the image forming operation. In this case, the time for interrupting the image forming operation and reading the check patterns alone of the pattern holder by the image reading device 130 is avoided. As a result, the downtime is prevented, so that a decrease in productivity is prevented.

However, in the example of FIG. 11, the image reading device 130 reads the check patterns at a position deviated from the position (in the main scanning direction) of the sheet S that is a detection target of the image abnormality. Therefore, the controller 150 does not directly execute an inspection to determine whether the detecting operation regarding the position of the sheet S (in the main scanning direction) is normal or not.

Therefore, the image reading device 130 may read the check pattern of the pattern holder at the same position as the position of the sheet S (i.e., position in the main scanning direction) that functions as a detection target of image abnormality.

Figure 12:
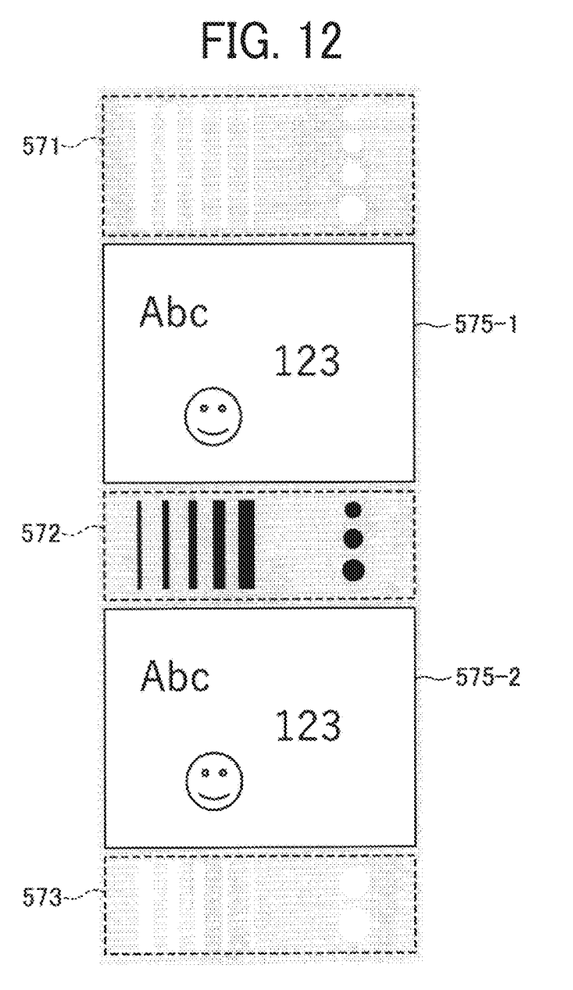
FIG. 12 is a diagram illustrating another example of a read image including the check pattern read by the image reader in the operation inspection process to inspect the detecting operation of the abnormality detector.

FIG. 12 is a diagram illustrating another example of a read image including the check pattern read by the image reading device 130 in the operation inspection process to inspect the detecting operation of the abnormality detector 140.

Check patterns 571 to 573 illustrated in FIG. 12 are similar to the check patterns 471 to 474 illustrated in FIG. 12 and are different in the positions of the patterns. The check patterns 571 and 573 include white spots and white streaks. The check pattern 572 includes black spots and black streaks. The check patterns 575-1 and 575-2 are images formed within the sheet (on the first page and the second page, respectively) and are similar to the image 475. As illustrated in FIG. 12, the check pattern of the pattern holder is disposed at the position in the main scanning direction, which is the same as the sheet S. The image reading device 130 reads the check pattern of the pattern holder between the sheets S while the continuous image forming operation is performed. In this case, since the position of the read check pattern is the same position in the main scanning direction as the position of the sheet S that is the detection target of the image abnormality, the controller 150 directly executes an inspection to determine whether the detecting operation regarding the position of the sheet S (in the main scanning direction) is normal or not.

However, typical image forming apparatuses currently have a relatively short distance between sheets S (a relatively short interval in a conveyance direction of the sheet S) while a continuous image forming operation is performed. Therefore, the length in the sub-scanning direction of the check pattern that can be read between the sheets S or the number of check patterns that can be disposed in the sub-scanning direction is limited. Due to such a configuration, there may be a case in which multiple check patterns are divided to be read over multiple sheets S. In this case, it is likely to take time for the operation inspection process for inspecting the detecting operation of the abnormality detector 140.

The configurations described above are examples, and modes of the present disclosure provide respective effects as follows.

First Mode

The first mode of the image abnormality detecting device (for example, the image abnormality detecting device 500) includes an image reader (for example, the image reading device 130), an abnormality detector (for example, the abnormality detector 140), a pattern holder (for example, the pattern holders 160a, 160b, 260, 360), and circuitry (for example, the controller 150). The image reader is configured to read an image on a recording medium (for example, sheet S). The abnormality detector is configured to detect abnormality of the image based on read information read by the image reader. The pattern holder has a check pattern (for example, the check patterns 171, 172, 271, 272a, 272b, 272c, 273, and 471-474). The pattern holder is disposed facing a reading area of the image reader within the reading area. The circuitry is configured to inspect a detecting operation of the abnormality detector based on read information of the check pattern read by the image reader.

Typical image forming apparatuses use a check image to be formed on a recording medium by the image forming device (for example, the image forming device 110), as a check pattern to be read by the image reader so as to inspect the detecting operation of the abnormality detector. The quality of the check image formed on the recording medium by the image forming device may depend on the machine condition at the time of image formation, and sufficient inspection accuracy may not be obtained. Further, the quality of the check image may depend on the type (e.g., color, surface property) of a recording medium on which the check image is formed, and sufficient inspection accuracy may not be obtained.

In the present mode, the pattern holder includes a predetermined check pattern, and the predetermined check pattern disposed facing the reading area of the image reader within the reading area of the image reader is used as a check pattern to inspect the detecting operation of the abnormality detector. Since the check pattern is provided on the pattern holder in advance, the quality of the check pattern is constant. That is, since the check pattern is not an image formed on a recording medium by the image forming device, the quality of the check pattern is not affected by, for example, the machine condition and the type of the recording medium. Due to this configuration, the image abnormality detecting device obtains the inspection accuracy higher than typical image abnormality detecting devices.

Second Mode

In the second mode, the image abnormality detecting device according to the first mode further includes a conveyor (for example, the sheet conveyor 120) configured to convey the recording medium (for example, the sheet S) to pass in the reading area of the image reader (for example, the image reading device 130). The pattern holder (for example, the pattern holders 160a, 160b, 260, 360) is rotatable to move the check pattern in a conveyance direction of the recording medium. The abnormality detector (for example, the abnormality detector 140) is configured to detect abnormality of the image based on the read information of the image on the recording medium, read by the image reader. The circuitry (for example, the controller 150) is configured to inspect the detecting operation of the abnormality detector based on the read information of the check pattern read by the image reader while the pattern holder is rotating.

According to this configuration, the area on the pattern holder where the check pattern is disposed is not limited to the size of the reading area of the image reader (for example, the image reading device 130). Due to such a configuration, the length (in the conveyance direction of the recording medium) of the check pattern included in the read information is increased, or the number of check patterns that may be disposed in the conveyance direction of the recording medium may be increased.

Third Mode

In the third mode, in the image abnormality detecting device according to the first mode or the second mode, the pattern holder (for example, the pattern holders 160a, 160b, 260, 360) includes multiple pattern-formed faces on each of which multiple check patterns are formed. A pattern-formed face in the reading area is switchably selected from the multiple pattern-formed faces. The circuitry (for example, the controller 150) is configured to inspect the detecting operation of the abnormality detector (for example, the abnormality detector 140) based on the read information of the check pattern on the selected pattern-formed face, read by the image reader (for example, the image reading device 130), when the selected pattern-formed face selected in accordance with a predetermined selection condition is in the reading area.

According to this configuration, since the area on the pattern holder where the check pattern is disposed is not limited to the size of the reading area of the image reader (for example, the image reading device 130), the number of check patterns to be used for inspecting the detecting operation of the abnormality detector is increased.

Fourth Mode

In the fourth mode, in the image abnormality detecting device according to any one of the first mode to the third mode, the check pattern is a pattern based on which the abnormality detector (for example, the abnormality detector 140) detects an image abnormality.

Due to such a configuration, the circuitry (for example, the controller 150) causes the abnormality detector to detect image abnormality based on the read information of the check pattern read by the image reader (for example, the image reading device 130), so as to inspect the detecting operation of the abnormality detector based on whether the image abnormality is normally detected or not. In this case, by causing the abnormality detector to perform the normal detecting operation of image abnormality, the circuitry causes the detecting operation to be inspected easily.

Fifth Mode

In the fifth mode, in the image abnormality detecting device according to any one of the first mode to the fourth mode, the check pattern includes multiple patterns each being different in at least one of a shape, an image density, or a dimension.

According to this configuration, more detailed inspection is made to the detecting operation of the abnormality detector (for example, the abnormality detector 140).

Sixth Mode

In the sixth mode, in the image abnormality detecting device according to any one of the first mode to the fifth mode, the check pattern includes multiple patterns each having a check image within multiple background images having different image densities.

According to this configuration, the detecting operation for detecting abnormal image (image abnormality) occurred within the multiple background images having different image densities from each other is appropriately inspected.

Seventh Mode

In the seventh mode, an image forming apparatus (for example, the image forming apparatus 100) includes an image forming device (for example, the image forming device 110) configured to form an image on a recording medium (for example, the sheet S), and the image abnormality detecting device (for example, the image abnormality detecting device 500) according to any one of the first mode to the sixth mode, configured to detect image abnormality in the image formed on the recording medium by the image forming device.

According to this configuration, the image abnormality detecting device included in the image forming apparatus inspects the detecting operation of the abnormality detector (for example, the abnormality detector 140) with higher accuracy.

Eighth Mode

In the eighth mode, in the image forming apparatus (for example, the image forming apparatus 100) according to the seventh mode, the circuitry (for example, the controller 150) is configured to inspect the detecting operation of the abnormality detector (for example, the abnormality detector 140) based on read information read by the image reader (for example, the image reading device 130) between recording media (for example, the sheets S) while a continuous image forming operation is performed.

According to this configuration, since the position of the read check pattern (in the width direction of the recording medium) is the same position as the position of the recording medium that is the detection target of the image abnormality, the circuitry directly executes an inspection to determine whether the detecting operation regarding the position of the recording medium is normal or not. Moreover, since the continuous image forming operation is not interrupted, the downtime is prevented, and the decrease in productivity is prevented.

Ninth Mode

In the ninth mode, in the image forming apparatus (for example, the image forming apparatus 100) according to the seventh mode, the circuitry (for example, the controller 150) is configured to inspect the detecting operation of the abnormality detector (for example, the abnormality detector 140) based on read information read by the image reader (for example, the image reading device 130) between recording media (for example, the sheets S) while an image forming operation is performed.

In this case, since the time for interrupting the image forming operation and reading the check patterns alone of the pattern holder (for example, the pattern holders 160a, 160b, 260, 360) by the image reader is avoided, the downtime is prevented, and the decrease in productivity is prevented.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image abnormality detecting device comprising:
   an image reader configured to,
      read an image on a recording medium to obtain first read information, and
      read a check pattern to obtain second read information, the check pattern including a first image abnormality;
   an abnormality detector configured to,
      perform a detection operation based on the first read information, the detection operation including detecting one or more image abnormalities, and
      perform the detection operation based on the second read information;
   a pattern holder having the check pattern, the pattern holder being within a reading area of the image reader; and
   circuitry configured to inspect the detection operation of the abnormality detector based on the second read information,
   wherein
      the pattern holder is rotatable to move the check pattern in a conveyance direction of the recording medium while the image reader is reading the check pattern to obtain the second read information, or
      the check pattern is a selected check pattern, the pattern holder having multiple faces, each of the multiple faces having a respective check pattern, the pattern holder being configured to switchably select a selected face among the multiple faces, the selected face having the selected check pattern, and the selected face being within a reading area of the image reader.

2. The image abnormality detecting device according to claim 1, further comprising:
   a conveyor configured to convey the recording medium such that the recording medium passes the reading area of the image reader,
   wherein
      the pattern holder is rotatable to move the check pattern in the conveyance direction of the recording medium, and
      the abnormality detector is configured to detect a second image abnormality of the image based on the first read information of the image on the recording medium read by the image reader.

3. The image abnormality detecting device according to claim 1, wherein
   each of the multiple faces has multiple respective check patterns;
   the pattern holder is configured to switchably select the selected face according to a selection condition; and
   the image reader is configured to read the check pattern when the selected face is in the reading area.

4. The image abnormality detecting device according to claim 1,
   wherein the check pattern includes multiple patterns, the multiple patterns being different in at least one of shape, image density, or dimension.

5. The image abnormality detecting device according to claim 1,
   wherein the check pattern includes multiple patterns, the multiple patterns having check images within multiple background images of different image densities.

6. The image abnormality detecting device according to claim 1,
   wherein the image reader is configured to read the second read information between recording media.

7. The image abnormality detecting device to claim 1,
   wherein the image reader is configured to read the image on the recording medium and the check pattern together.

8. The image abnormality detecting device to claim 1,
   wherein the one or more image abnormalities include a spot, a void or a streak.

9. The image abnormality detecting device to claim 1, further comprising:
   a plurality of pattern holders including the pattern holder, each of the plurality of pattern holders having a respective check pattern.

10. The image abnormality detecting device to claim 1,
    wherein the pattern holder is rotatable to move the check pattern in a conveyance direction of the recording medium, the pattern holder has having a circular cross section.

11. An image forming apparatus comprising:
    an image forming device configured to form an image on a recording medium; and
    an image abnormality detecting device configured to detect a first image abnormality in the image formed on the recording medium by the image forming device, the image abnormality detecting device comprising:
       an image reader configured to,
          read the image on the recording medium to obtain first read information, and
          read a check pattern to obtain second read information, the check pattern including a second image abnormality;
       an abnormality detector configured to,
          perform a detection operation based on the first read information, the detection operation including detecting one or more image abnormalities, and
          perform the detection operation based on the second read information;
       a pattern holder having the check pattern, the pattern holder being within a reading area of the image reader; and
       circuitry configured to inspect the detection operation of the abnormality detector based on the second read information,
       wherein
          the pattern holder is rotatable to move the check pattern in a conveyance direction of the recording medium while the image reader is reading the check pattern to obtain the second read information, or
          the check pattern is a selected check pattern, the pattern holder having multiple faces, each of the multiple faces having a respective check pattern, the pattern holder being configured to switchably select a selected face among the multiple faces, the selected face having the selected check pattern, and the selected face being within a reading area of the image reader.

12. The image forming apparatus according to claim 11, wherein the image reader is configured to read the second read information between recording media in a continuous image forming operation.

13. The image forming apparatus according to claim 11, wherein
the image reader is configured to read the image on the recording medium and the check pattern together in an image forming operation.

14. The image forming apparatus according to claim 11, wherein the image abnormality detecting device further comprises:
a conveyor configured to convey the recording medium such that the recording medium passes the reading area of the image reader,
wherein
the pattern holder is rotatable to move the check pattern in the conveyance direction of the recording medium, and
the abnormality detector is configured to detect the first image abnormality of the image based on the first read information of the image on the recording medium read by the image reader.

15. The image forming apparatus according to claim 11, wherein
each of the multiple faces has multiple check patterns;
the pattern holder is configured to switchably select the selected face; and
the image reader is configured to read the check pattern when the selected face is in the reading area.

16. The image forming apparatus according to claim 11, wherein the check pattern includes multiple patterns, the multiple patterns being different in at least one of shape, image density, or dimension.

17. The image forming apparatus according to claim 11, wherein the check pattern includes multiple patterns, the multiple patterns having check images within multiple background images of different image densities.

18. The image forming apparatus according to claim 11, wherein the one or more image abnormalities include a spot, a void or a streak.

19. The image forming apparatus according to claim 11, wherein the image abnormality detecting device further comprises:
a plurality of pattern holders including the pattern holder, each of the plurality of pattern holders having a respective check pattern.

20. The image forming apparatus according to claim 11, wherein the pattern holder is rotatable to move the check pattern in a conveyance direction of the recording medium, the pattern holder having a circular cross section.

* * * * *